United States Patent Office 3,625,661
Patented Dec. 7, 1971

3,625,661
SEPARATION OF TITANIUM FLUORIDE AND NIOBIUM FLUORIDE FROM GASEOUS URANIUM HEXAFLUORIDE CONTAINING SAME
Lowell W. Anderson and Michael J. Stephenson, Oak Ridge, Tenn., assignors to the United States of America as represented by the United States Atomic Energy Commission
No Drawing. Filed Aug. 11, 1969, Ser. No. 849,200
Int. Cl. C01g 56/00
U.S. Cl. 23—337                              3 Claims

ABSTRACT OF THE DISCLOSURE

This invention relates to a method of selectively removing titanium or niobium values from a gaseous mixture of uranium hexafluoride and niobium pentafluoride or titanium tetrafluoride by passing the mixture through a bed of pelletized complex fluoride at a temperature in the range of 200° F. to 400° F.

BACKGROUND OF THE INVENTION

This invention was made in the course of, or under, a contract with the U.S. Atomic Energy Commission.

This invention relates generally to the processing of gaseous uranium hexafluoride and more particularly to a process for selectively removing titanium or niobium values from gaseous uranium hexafluoride containing titanium tetrafluoride or niobium pentafluoride.

In gaseous diffusion processes for the separation of uranium isotopes, uranium hexafluoride ($UF_6$) is employed as the process gas. The $UF_6$ commonly contains small amounts of various undesirable volatile metal fluorides. In $UF_6$ derived from natural uranium the volatile fluorides may be corrosion products generated during the processing of the natural uranium to $UF_6$. In $UF_6$ derived from the processing of spent nuclear fuels containing irradiated uranium, the volatile fluorides may be corrosion products or they may be volatile-fluoride compounds of certain fission products.

For example, in fluid-bed volatility processes for recovering fissionable material from spent reactor fuels, volatile $UF_6$ is produced by reaction of the fuel with gaseous fluorinating agents, such as $ClF_3$, $BrF_5$, or $F_2$. In this reaction volatile fluorides of various corrosion products or fission products are produced-fluorides such as $TiF_4$, $RuF_5$, $SbF_5$, $NbF_5$, and $TaF_5$. Current Federal specifications on diffusion plant feed limit the permissible maximum concentration of titanium, ruthenium, antimony, niobium, and tantalum to one part-per-million each, based on the weight of the uranium in the feed.

Referring particularly to the removal of $TiF_4$ and $NbF_5$ from gaseous $UF_6$, it is old in the art to remove $NbF_5$ from $UF_6$ by passing the mixture through pelletized NaF. The NaF, however, must be maintained at comparatively high temperatures (e.g., temperatures exceeding 625° F.) to avoid excessive sorption of the valuable $UF_6$. Operation at these high temperatures is both costly and inconvenient. Another disadvantage of NaF is that it is not an effective sorbent for $TiF_4$. Pelletized $MgF_2$ at a temperature of 250° F. has been used to sorb relatively large quantities of $NbF_5$ and $TiF_4$ from $UF_6$ streams containing the same. But even at 250° F. the $MgF_2$ sorbs quantities of $UF_6$ which are significant, particularly when it is considered that a single diffusion plant trap may contain a thousand pounds of sorbent.

SUMMARY OF THE INVENTION

This invention is based on the discovery that a porous bed of a particulate complex fluoride such as $Na_3AlF_6$, $Na_2SiF_6$, and $Na_2ZrF_6$ will selectively sorb titanium tetrafluoride ($TiF_4$) or niobium pentafluoride ($NbF_5$) from streams of $UF_6$ at a temperature in the range of 200° F. to 400° F. The sorbent can be prepared in the form of pellets by extruding or molding a mixture formed by blending water and a powder form of the complex fluoride. The pellets are dried, sintered, and fluorinated before use.

It is a general object of this invention to provide a method for selectively sorbing titanium and niobium values from a gaseous mixture of uranium hexafluoride and a volatile fluoride of titanium or niobium, the sorption process being characterized by comparatively low operating temperatures and by the removal of comparatively small amounts of uranium hexafluoride from the stream. Other objects of the invention will be made apparent in the following examples or in the appended claims.

EXAMPLE I

Removal of $NbF_5$ with pelletized $Na_3AlF_6$

Pellets of $Na_3AlF_6$ were prepared by blending commercial-grade $Na_3AlF_6$ (sodium aluminum fluoride) with water (10% by weight) and stearic acid (1% by weight). This mixture was extruded in the form of cylindrical pellets. After extrusion, the pellets were air-dried and then heated gradually to 1000° F. while being exposed to a stream of nitrogen containing a small percentage of fluorine. This treatment, which was conducted for three hours, sintered the pellets and fluorinated off the stearic acid lubricant, leaving hardened pellets suitable for exposure to UF. The product pellets were silver-gray and measured approximately 3/16" in diameter and 1/2" in length. The pellets had a nitrogen-surface-area of 0.54 m.²/g. and a porosity of 0.368 (as measured by mercury intrusion).

A vertically oriented Monel cylinder was loaded with the abovementioned pellets to provide a porous bed. The cylinder had an internal diameter of three inches and was four feet long. It was provided with a gas inlet near its top end and with a gas outlet near its base. The cylinder was filled with pelletized $Na_3AlF_6$ to a height of nearly four feet. For purposes of comparison, a perforated cup containing a single layer of $MgF_2$ pellets was suspended in the cylinder above the $Na_3AlF_6$ bed and four inches below the inlet. The $MgF_2$ pellets had diameters ranging from 3/16" to 5/16".

The following data relate to the performance of the sorbents when the gas feed to the above-mentioned cylinder comprised a mixture of $N_2$ and $UF_6$ containing a known small concentration of niobium in the form of $NbF_5$.

Feed gas—1.0 lb./hr. $N_2$; 24 lb./hr. $UF_6$; 75.6 p.p.m. Nb (on a uranium metal basis) average for entire run; 48 p.p.m. Nb for last 25 hours of run.
Pressure—17 p.s.i.a.
Velocity—0.5 ft./sec.
$Na_3AlF_6$ bed dimensions—diameter, 2 7/8"; depth, 3.8'
Weight of $Na_3AlF_6$—15.0 lbs.
Bed temperature—250° F.
Length of run—50 hours.
Niobium (Nb) in feed gas leaving $Na_3AlF_6$ bed—Less than 0.5 p.p.m. Nb for last 25 hours of the run, indicating removal of better than 98% of the niobium.
Niobium (Nb) retention on $Na_3AlF_6$ pellets—Niobium accounted for 1.638% of the final weight of the top 6" of the bed and for less than 0.01% of weight of the bottom 6" of the bed. (Bed was not saturated in 50 hours of operation.)
Uranium (U) retention on $Na_3AlF_6$ pellets—Uranium accounted for 0.04% of the final weight of the top 6"

of the bed and for 0.15% of the weight of the bottom 6″ of the bed.

Niobium (Nb) retention on $MgF_2$ pellets—Niobium accounted for 3.32% of the final weight of the single layer of $MgF_2$ pellets. (These pellets were fully saturated.)

Uranium (U) retention on $MgF_2$ pellets—Uranium accounted for 2.08% of the final weight of the $MgF_2$ pellets.

In the foregoing run the amount of niobium in the feed averaged 75.6 p.p.m. It is apparent, therefore, that the $Na_3AlF_6$ was a highly selective sorbent for removing $NbF_5$ from the input stream. Note that the $Na_3AlF_6$ exhibited a significantly lower degree of uranium loading than the $MgF_2$.

EXAMPLE II

Sorption of $TiF_4$ with pelletized $Na_3AlF_6$

The following data relate to a $TiF_4$-sorption experiment conducted with $Na_3AlF_6$ pellets of the kind described in Example I. In this test the pellets were contained in a perforated cup fitted into the upper end of the cylinder, just below the inlet. For comparison, a 6″ layer of the above-mentioned $MgF_2$ pellets was placed in the cylinder, just below the $Na_3AlF_6$ pellets.

Feed gas—1.0 lb./hr. $N_2$; 23 lb./hr. $UF_6$; 20 p.p.m. Ti (on a uranium basis).
Pressure—17 p.s.i.a.
Velocity—0.5 ft./sec.
$Na_3AlF_6$ bed dimensions—diameter, 2⅞″; depth, ½″.
Weight of $Na_3AlF_6$—40 grams.
Bed temperature—250° F.
Length of run—50 hours.
Titanium (Ti) retention on $Na_3AlF_6$—Titanium accounted for 1.12% of the final weight of the pellets.
Uranium (U) retention on $Na_3AlF_6$—Uranium accounted for 0.31% of the final weight of the pellets.
Titanium (Ti) retention on $MgF_2$—Titanium accounted for 1.03% of the final weight of the $MgF_2$ pellets.
Uranium (U) retention on $MgF_2$—Uranium accounted for 2.2% of the final weight of the $MgF_2$ pellets.

In the foregoing run the amount of titanium in the feed was 20 p.p.m. Thus, the $Na_3AlF_6$ was a highly selective sorbent for removing $TiF_4$ from the input gas. As shown, the $Na_3AlF_6$ exhibited significantly less uranium loading than the $MgF_2$.

The run just described was of an exploratory nature and was designed to establish whether $Na_3AlF_6$ would in fact selectively remove titanium-fluoride without incurring high uranium loadings. This was substantiated by the results obtained. Given these results, one versed in the art can readily select the proper process parameters (bed dimensions, input velocity, etc.) to apply the process to a specific $TiF_4$-removal problem.

EXAMPLE III

Removal of $TiF_4$ with pelletized $Na_2SiF_6$

Pellets of $Na_2SiF_6$ were prepared by blending commercial-grade $Na_2SiF_6$ with water (10% by weight) and stearic acid (1% by weight). This mixture was extruded in the form of cylindrical pellets. After extrusion the pellets were heated gradually to 1000° F. while being exposed to a stream of nitrogen containing a small percentage of fluorine. This treatment, which was conducted for three hours, dried the pellets and fluorinated off the stearic acid lubricant, leaving hardened pellets suitable for exposure to $UF_6$. The product pellets were whitish-gray and measured approximately 3/16″ in diameter and ½″ in length. They had a nitrogen-surface-area of 0.326 m.²/g. and a porosity of 0.295 (as measured by mercury intrusion).

A perforated cup containing $Na_2SiF_6$ pellets of the kind just described was fitted in the upper end of a vertically oriented cylinder, having a gas inlet near its top and a gas outlet near its base. The cup was fitted in the cylinder just below its inlet. For comparison, a 6″ layer of the above-mentioned $MgF_2$ pellets was placed in the cylinder just below the $Na_2SiF_6$ pellets.

The following data relate to the performance of the sorbents with a gas input to the cylinder comprising a mixture of $N_2$ and $UF_6$ containing a known small concentration of titanium in the form of $TiF_4$.

Feed gas—1.0 lb./hr. $N_2$; 23 lb./hr. $UF_6$; 20 p.p.m. Ti, based on uranium.
Pressure—17 p.s.i.a.
Velocity—0.5 ft./sec.
$Na_2SiF_6$ bed dimensions—Diameter, 2⅞″; depth ½″.
Weight of $Na_2SiF_6$—40 grams.
Bed temperature—250° F.
Length of run—50 hours.
Titanium (Ti) retention on $Na_2SiF_6$—Titanium accounted for 1.15% of the final weight of the pellets.
Uranium (U) retention on $Na_2SiF_6$—Uranium accounted for 0.41% of the final weight of the pellets.
Titanium (Ti) retention on $MgF_2$—Titanium accounted for 1.03% of the final weight of the $MgF_2$ pellets.
Uranium (U) retention on $MgF_2$—Uranium accounted for 2.2% of the final weight of the $MgF_2$ pellets.

In the foregoing run the amount of titanium in the feed was 20 p.p.m. It is apparent, therefore, that the $Na_2SiF_6$ was a highly selective sorbent for $TiF_4$. The uranium loading of the $Na_2SiF_6$ was appreciably lower than that of the $MgF_2$.

EXAMPLE IV

Sorption of $NbF_5$ with pelletized $Na_2SiF_6$

The following data relate to a run conducted in the same equipment and under the same conditions as described above, with the exceptions that the feed gas contained $NbF_5$ rather than $TiF_4$ and that a single layer of $MgF_2$ pellets was provided in the inlet end of the cylinder, as in Example I. The niobium content of the feed gas was 75.6 p.p.m. Nb, based on uranium.

Niobium (Nb) retention on $Na_2SiF_6$—Analysis showed that Nb accounted for 2.79% of the final weight of the pellets.
Uranium (U) retention on $Na_2SiF_6$—Analysis showed that U accounted for 0.50% of the final weight of the pellets.
Niobium (Nb) retention of $MgF_2$—Niobium accounted for 3.3% of the final weight of the $MgF_2$.
Uranium (U) retention on $MgF_2$—Uranium accounted for 2% of the final weight of the $MgF_2$.

As in the run made with $TiF_4$, the $Na_2SiF_6$ sorbent was found to be highly selective for the impurity of interest. Its uranium loading was less than that of the $MgF_2$.

EXAMPLE V

Removal of $TiF_4$ with pelletized $Na_2ZrF_6$

Pellets of $Na_2ZrF_6$ were prepared by extruding a blended mixture of commercial-grade $Na_2ZrF_6$, water (10% by weight), and stearic acid (1% by weight). The extruded pellets were treated as described above in connection with Example III.

A perforated cup was filled with $Na_2ZrF_6$ pellets prepared as described. The loaded cup was fitted in the upper end of a vertically oriented cylinder of the type referred to in Example IV. In this instance the feed gas comprised a mixture of $N_2$ and $UF_6$ containing a known small concentration of titanium as $TiF_4$. The run data are summarized below. A 6″ layer of $MgF_2$ pellets of the size referred to in Example I was included in the cylinder below the $Na_2ZrF_6$ pellets.

Feed gas—1 lb./hr. $N_2$; 31.1 lb./hr. $UF_6$; 1.5 lb./hr. $F_2$; 22.5 p.p.m. Ti (on a uranium basis)
Pressure—17 p.s.i.a.
Velocity—0.6 f.p.s.
$Na_2ZrF_6$ bed dimensions—3/16″ x 3″
Weight of $Na_2ZrF_6$—30 grams
Bed temperature—250° F.
Length of run—50 hours
Titanium (Ti) retention on $Na_2ZrF_6$—Titanium accounted for 0.43% of the final weight of the pellets.
Uranium (U) retention on $Na_2ZrF_6$—Uranium accounted for 2.05% of the final weight of the pellets.
Titanium (Ti) retention on $MgF_2$—Titanium accounted for 0.81% of the final weight of the pellets.
Uranium (U) retention on $MgF_2$—Uranium accounted for 3.05% of the final weight of the pellets.

In the exploratory run just described, the titanium loading for the $Na_2ZrF_6$ was only about half that for the $MgF_2$. However, the uranium loading was significantly less for the $Na_2ZrF_6$.

The small amounts of the complex fluoride sorbent used in Examples III, IV, and V were sufficient to establish selectivity for the impurity of interest and comparatively low uranium loading. Persons versed in the art can readily apply the process to specific $TiF_4$- or $NbF_5$-sorption problems. It will be understood that the physical properties given above for the various pellets may not be the optimum. Suitable pellets have been prepared not only by extrusion but by forming in a die.

As mentioned, pelletized NaF has been used previously for the sorption of volatile metal fluoride impurities—e.g., $NbF_5$—from $UF_6$ gas streams, but it is subject to the disadvantages of high uranium loadings. For example, in runs conducted at 250° F., the $UF_6$ loading of the NaF pellets was found to exceed 40%. Examples I–V, above, illustrate the unexpected finding that a complex fluoride containing sodium is less subject to such loading.

Although this method has been illustrated above in terms of the use of selected sodium-containing double fluorides as sorption-agents, it will be apparent that it is within the scope of this invention to replace the sodium cation in these double fluorides with a cation of another alkali metal (lithium, potassium, rubidium, cesium) or of the closely related alkaline-earth metals (beryllium, magnesium, calcium, strontium, barium).

It is likely that this method is applicable to the removal of other volatile metal fluoride impurities from gaseous $UF_6$-impurities such as $TaF_5$, $SbF_5$, and $RuF_5$.

The foregoing examples are illustrative and are not to be understood as limiting the scope of our invention, which is limited only as indicated by the appended claims.

What is claimed is:

1. A method for selectively removing titanium and niobium values from a gaseous mixture of uranium hexafluoride and a gas selected from the group consisting of titanium fluoride and niobium fluoride comprising passing said mixture through a porous bed of a complex fluoride at a temperature in the range of 200° F. to 400° F., said complex fluoride comprising a cation of an alkali metal and a complex fluoro anion selected from the group consisting of $AlF_6^{\equiv}$, $ZrF_6^{=}$, and $SiF_6^{=}$.

2. The method according to claim 1 in which the uranium hexafluoride gas issuing from the contacted bed contains less than 2 p.p.m. of either one of said values.

3. The method of claim 1 wherein said cation is a sodium ion.

References Cited
UNITED STATES PATENTS

| | | | |
|---|---|---|---|
| 2,903,333 | 9/1959 | Lowe et al. | 23—337 |
| 2,952,511 | 9/1960 | Maddock et al. | 23—337 |
| 3,165,376 | 1/1965 | Golliher | 23—337 |
| 3,178,258 | 4/1965 | Cathers et al. | 23—337 |
| 3,423,190 | 1/1969 | Steindler et al. | 23—326 |
| 3,458,291 | 7/1969 | Riha et al. | 23—337 |
| 3,493,331 | 2/1970 | Vancil et al. | 23—88 |

OTHER REFERENCES

Smiley et al: Removal of Impurities from Uranium Hexafluoride by Selective Sorption Techniques—Trans. Am. Nucl. Soc.—vol. 10, #2, 1967, p. 507.

CARL D. QUARFORTH, Primary Examiner

F. M. GITTES, Assistant Examiner

U.S. Cl. X.R.

23—2 S, 21, 88, 326, 352